United States Patent [19]

Carpenter

[11] Patent Number: 5,198,106
[45] Date of Patent: * Mar. 30, 1993

[54] UNPOTTED APPARATUS FOR MAGNETICALLY TREATING FLOWING LIQUIDS

[76] Inventor: Roland K. Carpenter, 251 W. Canal Dr., Palm Harbor, Fla. 34684

[*] Notice: The portion of the term of this patent subsequent to Jan. 7, 2009 has been disclaimed.

[21] Appl. No.: 839,803

[22] Filed: Feb. 21, 1992

Related U.S. Application Data

[63] Continuation-in-part of Ser. No. 105,818, Aug. 14, 1991, which is a continuation of Ser. No. 568,771, Aug. 17, 1990, Pat. No. 5,078,870.

[51] Int. Cl.⁵ .............................................. C02F 1/48
[52] U.S. Cl. ..................................... 210/222; 210/232; 55/100
[58] Field of Search .................... 210/232, 222, 695; 55/100; 123/536, 538

[56] References Cited

U.S. PATENT DOCUMENTS

| | | | |
|---|---|---|---|
| 3,228,878 | 1/1966 | Moody | 210/222 |
| 4,157,963 | 6/1979 | Jessop et al. | 210/222 |
| 4,210,535 | 7/1980 | Risk | 210/222 |
| 4,265,746 | 5/1981 | Zimmerman, Sr. et al. | 210/695 |
| 4,265,755 | 5/1981 | Zimmerman | 210/222 |
| 4,367,143 | 1/1983 | Carpenter | 210/222 |
| 4,572,145 | 2/1986 | Mitchell et al. | 210/222 |
| 4,888,113 | 12/1989 | Holcomb | 210/222 |
| 4,946,590 | 8/1990 | Hertzog | 210/232 |
| 4,956,084 | 9/1990 | Stevens | 210/222 |
| 5,078,870 | 1/1992 | Carpenter | 210/222 |

FOREIGN PATENT DOCUMENTS 1155086 10/1983 Canada.

Primary Examiner—Matthew O. Savage
Attorney, Agent, or Firm—Peterson, Wicks, Nemer & Kamrath

[57] ABSTRACT

The apparatus (12, 112) includes a preferred number of permanent magnet units (14, 114) held against the exterior of a pipe (10, 110) through which liquid flows. Each unit (14, 114) includes permanent magnet means (20, 120) and a housing (22, 122) which encloses and tightly holds the permanent magnet means (20, 120) with no loose components and without the use of a potting compound, with the permanent magnet means (20, 120) being accessible through slots (23) provide in the housing (22, 122). The housing (22, 122) is formed from a flat sheet and includes a bottom panel (24, 124), side panels (26, 126), inwardly extending top panels (28, 128), and end panels (32, 132). The bottom panel (24, 124) abuts with the bottom of the permanent magnet means (20, 120), the side panels (26, 126) are bent to abut with the sides of the permanent magnet means (20, 120), the end panels (32, 132) are bent to abut with the ends of the permanent magnet means (20, 120), and the top panels (28, 128) are bent to abut with the top of the permanent magnet means (20, 120). In one of the preferred embodiments, an elongated tie strap (160) is sandwiched between the permanent magnet means (120) and the housing (122) within a depression (164) formed in the bottom panel (124) and the side panels (126).

18 Claims, 4 Drawing Sheets

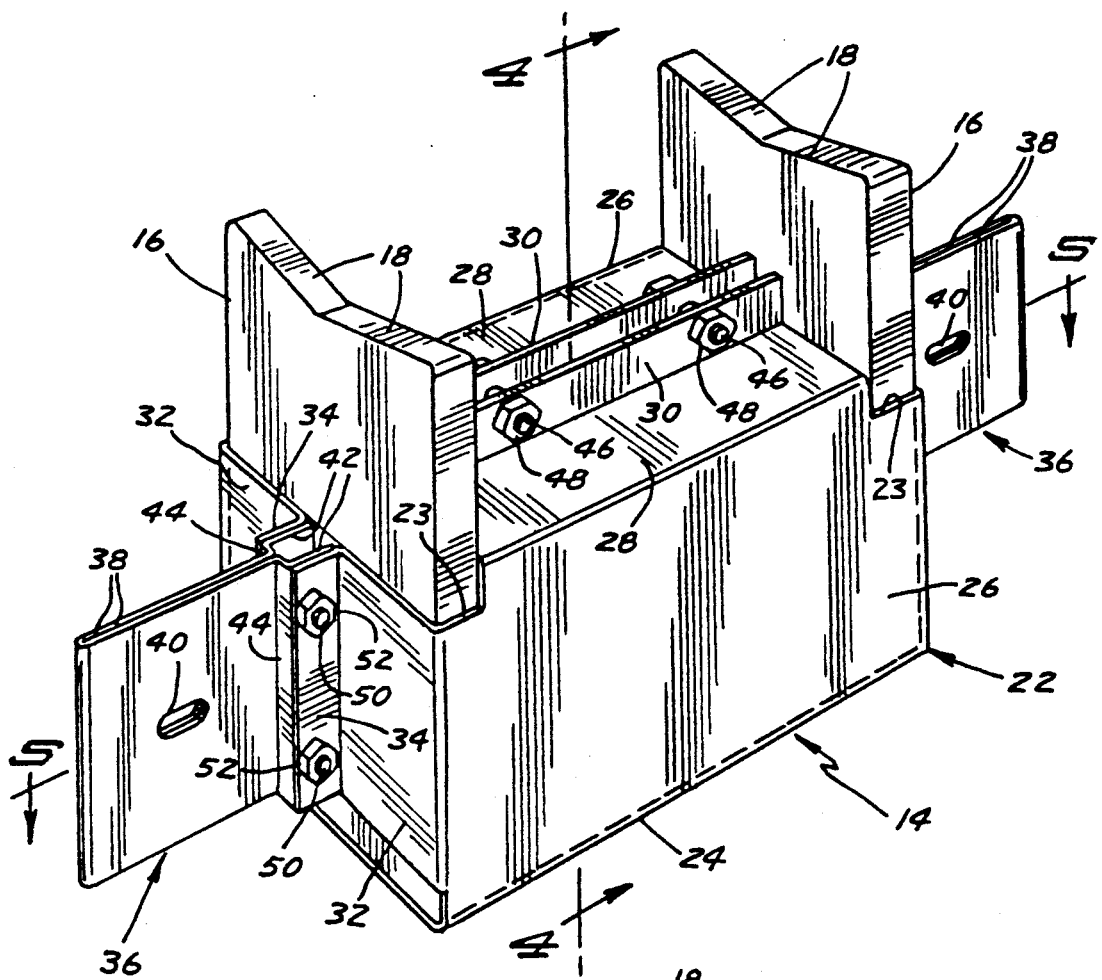
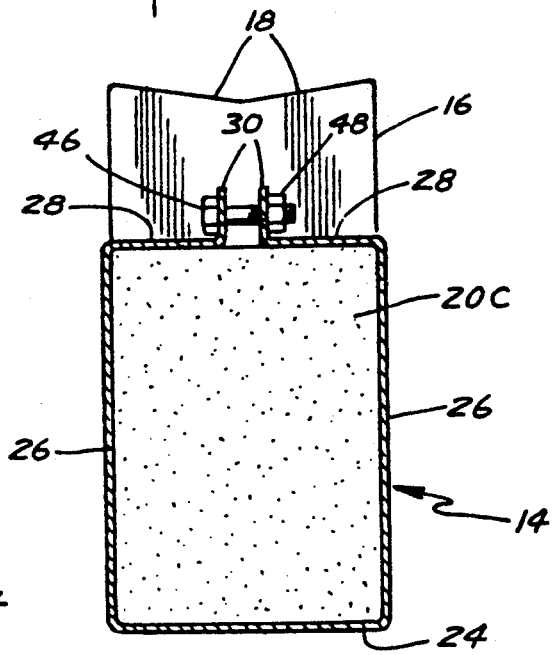

UNPOTTED APPARATUS FOR MAGNETICALLY TREATING FLOWING LIQUIDS

CROSS REFERENCE

This application is a continuation-in-part of U.S. application Ser. No. 105,818 filed Aug. 14, 1991 which is a continuation of U.S. application Ser. No. 568,771 filed Aug. 17, 1990, now U.S. Pat. No. 5,078,870.

BACKGROUND

1. Field of the Invention

This invention relates generally to apparatus for magnetically treating a liquid flowing through a pipe, and pertains more particularly to unpotted units that can be readily held in place against the exterior of the pipe to be serviced.

2. Description of the Prior Art

Perhaps U.S. Pat. No. 4,367,143 issued to Roland K. Carpenter on Jan. 4, 1983 for APPARATUS FOR MAGNETICALLY TREATING LIQUID FLOWING THROUGH A PIPE AND CLAMPING MEANS THEREFOR is representative of the state of the art. However, as mentioned in the applicant's issued Patent '143, U.S. Pat. No. 3,328,878 granted on Jan. 11, 1966 to Dean L. Moody for METHOD AND APPARATUS FOR TREATMENT OF FLOWING LIQUIDS TO CONTROL DEPOSITION OF SOLID MATTER THEREFROM also is representative of earlier prior art. As with the applicant's Patent '143 and Patent '878, both disclosures mention scale and paraffin problems, pointing out that scale can take various forms but typical of the substances creating scale problems are calcium carbonate, calcium sulfate, barium sulfate, sodium chloride, magnesium sulfate, silica, as well as various oils, waxes and greases in addition to paraffin. Accumulations of these substances on the interior of the pipe obviously produce problems, especially as far as causing a greater resistance to liquid flow within the pipe, and also where heat is applied to the pipe's exterior, the collected substances act as an objectionable thermal insulator. Sufficient accumulations, quite obviously, require that the piping system be inactivated and the pipes individually cleaned out, a time-consuming and costly procedure where the system is an industrial one, particularly due to the fact that the particular piping system is not productive during the shutdown period.

The polarization of diamagnetic materials through the agency of relatively strong magnetic fields provided by permanent magnetic means is generally well understood and need not be repeated at this time, although reference may be made to either of the patents herein referred to for a basic understanding of what is involved. Very succinctly, however, the principle behind the polarization is to prevent the formation of sufficiently objectionable deposits on the inside of the pipe, the magnetic action causing the diamagnetic materials to move inwardly under the influence of the sufficiently strong magnetic field provided by the two alluded to patented arrangements and which is even better achieved with the present invention as will soon become manifest. The difficulty is that with large diameter pipes the mounting of suitable permanent magnetic apparatus has posed a problem. Also, the cost per unit where a potting compound is used has proven to be unduly high, especially where large-diameter pipes are involved.

Examples of where large-diameter pipes are employed are at pipe line terminals where crude oil is transferred from a pipe line to a tanker after first having been stored in one or more settling tanks. Inasmuch as the moisture content for shipping crude oil must be less than 1.0%, chemicals are also used as dessicants to dehydrate the oil. The result is that basically three separations are obtained in the tank: (1) the oil that rises to the top, (2) the water that goes to the bottom, and (3) an intermediate emulsion layer containing oil and water. Obviously, the less emulsion, the better because it is a waste product (as of course is the amount of water that must be removed); however, whatever oil is contained in the emulsion is also lost, so it is extremely advantageous to minimize the amount of emulsion that is produced. Without my invention, a large tank has been needed, filled, chemicals added, and the contents allowed to statically set for at least 24 hours to dehydrate the water down to the required sufficiently low level. With my magnetic apparatus applied to the pipe line just before it enters the tank, the oil may be taken out of the tank almost immediately in that there is a higher percentage of oil and water separating with a concomitantly lesser amount of emulsion being formed. The tank, therefore, can be much smaller, the process being virtually continuous.

SUMMARY

While my invention operates on the same principle as other magnetic apparatus for treating liquids flowing through a pipe, an object of the present invention is to provide individual units that can be applied to the outside of the pipe in whatever number is needed to provide the diamagnetic polarization necessary to drive the diamagnetic substances inwardly away from the surfaces of the pipe's interior. While the number of individual units to be employed is susceptible to selection in accordance with the pipe diameter, the velocity of the liquid flowing through the pipe, the type of liquid and other factors, a general rule is that one unit be employed for each inch of pipe diameter. Hence, if the pipe diameter is four inches, four of my units would be employed, whereas if the pipe diameter is 60 inches, then 60 such units would be utilized.

The invention also has as an object the provision of exceedingly strong magnet units in relation to their overall size.

Another object of the invention is to provide units that can be readily mounted to the exterior of pipes. Yet another object of the invention in one of the embodiments thereof is to provide units that can be readily mounted to and demounted from the exterior of pipes irrespective of the pipe size. In this way, an aim of the invention is to allow an easy transposition of the units from one location to another, all in accordance with whatever location proves to be the most effective.

A very important object of the invention is to provide permanent magnet units that do not require the use of a potting compound as in the past. In this regard, an aim of the invention is to readily and quickly assemble the units at the factory as orders come in from the field for such units. Thus, when practicing my invention a large inventory need not be maintained of assembled units, as has been the case for potted units, for my units can be readily assembled as required.

Briefly, my invention envisages the use of an appropriate number of permanent magnet units that can be easily held in place against the exterior serface of various diameter pipes, my invention in a preferred embodiment permitting the appropriate number of such units to be held against the outside of the pipe through the agency of two flexible wires that are threaded through slots formed in oppositely issuing wings. The wings are bolted to a nonmagnetic housing which encloses the pack of permanent magnets and portions of the projecting pole pieces located at the ends of the pack. Whatever number of permanent magnet units are needed for the particular diameter of pipe can be selected and then easily held in place so that the pole faces of all of the units contact the proper segments of the pipe having the liquid flowing therethrough.

My invention also envisages the use of a housing formed from a flat sheet bent to define base, side, end, and top panels defining a volume for tightly holding permanent magnet means with no loose components and without the use of a potting compound. In a preferred embodiment, the units are attached to a pipe by an elongated tie strap which is located in a depression formed in the housing and sandwiched between the permanent magnet means and the base and side panels of the housing and which extends from the permanent magnet means generally contiguously from the side panels of the housing.

BRIEF DESCRIPTION OF THE DRAWINGS

FIG. 3 is a perspective view of the lowermost unit appearing in FIGS. 1 and 2, although each unit is actually identical;

FIG. 4 is a vertical section taken in the direction of line 4—4 of FIG. 3;

DESCRIPTION OF THE PREFERRED EMBODIMENTS

Figure 1:
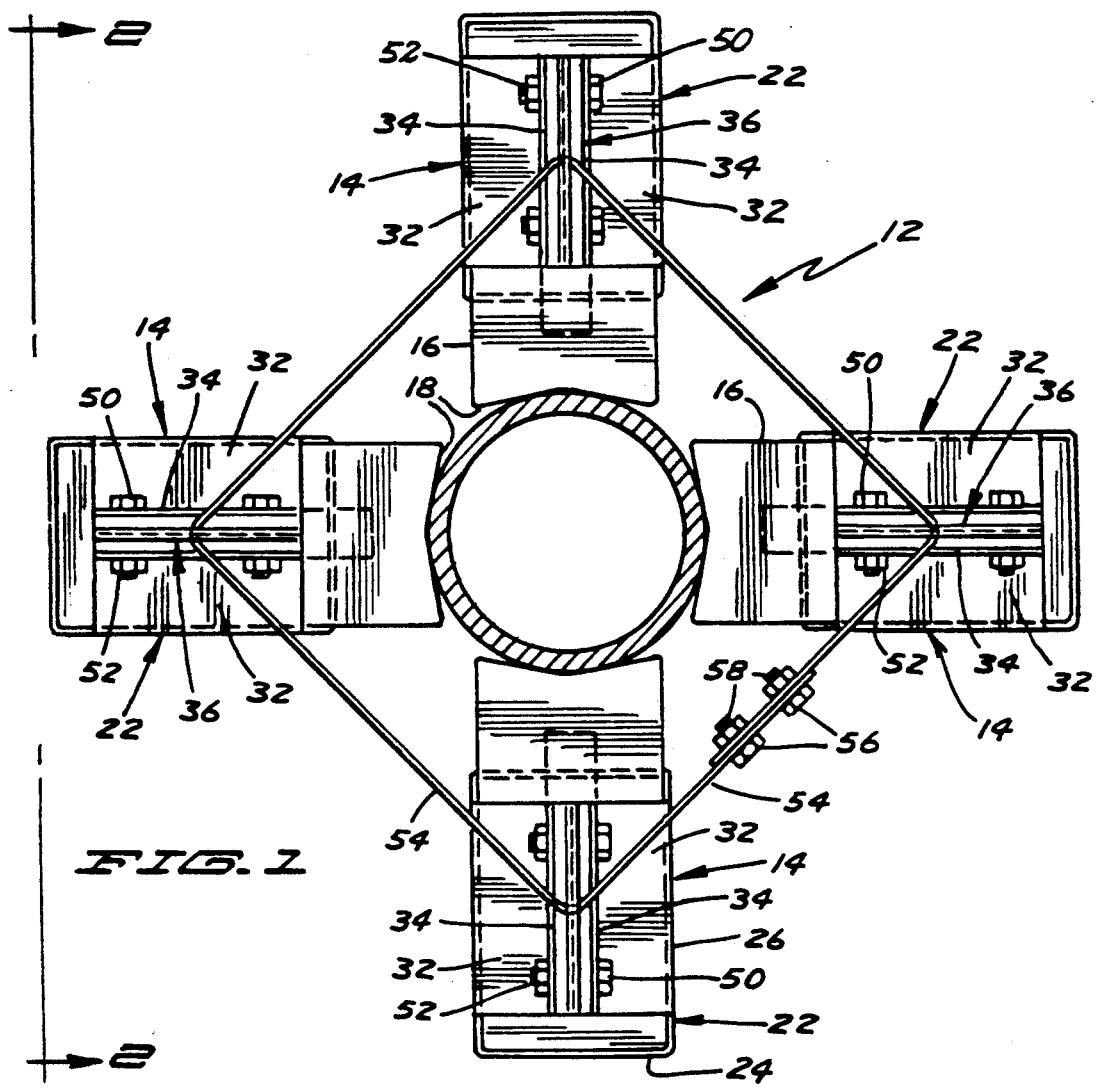
FIG. 1 is a sectional view through a pipe having my magnetic apparatus attached thereto.
Figure 2:
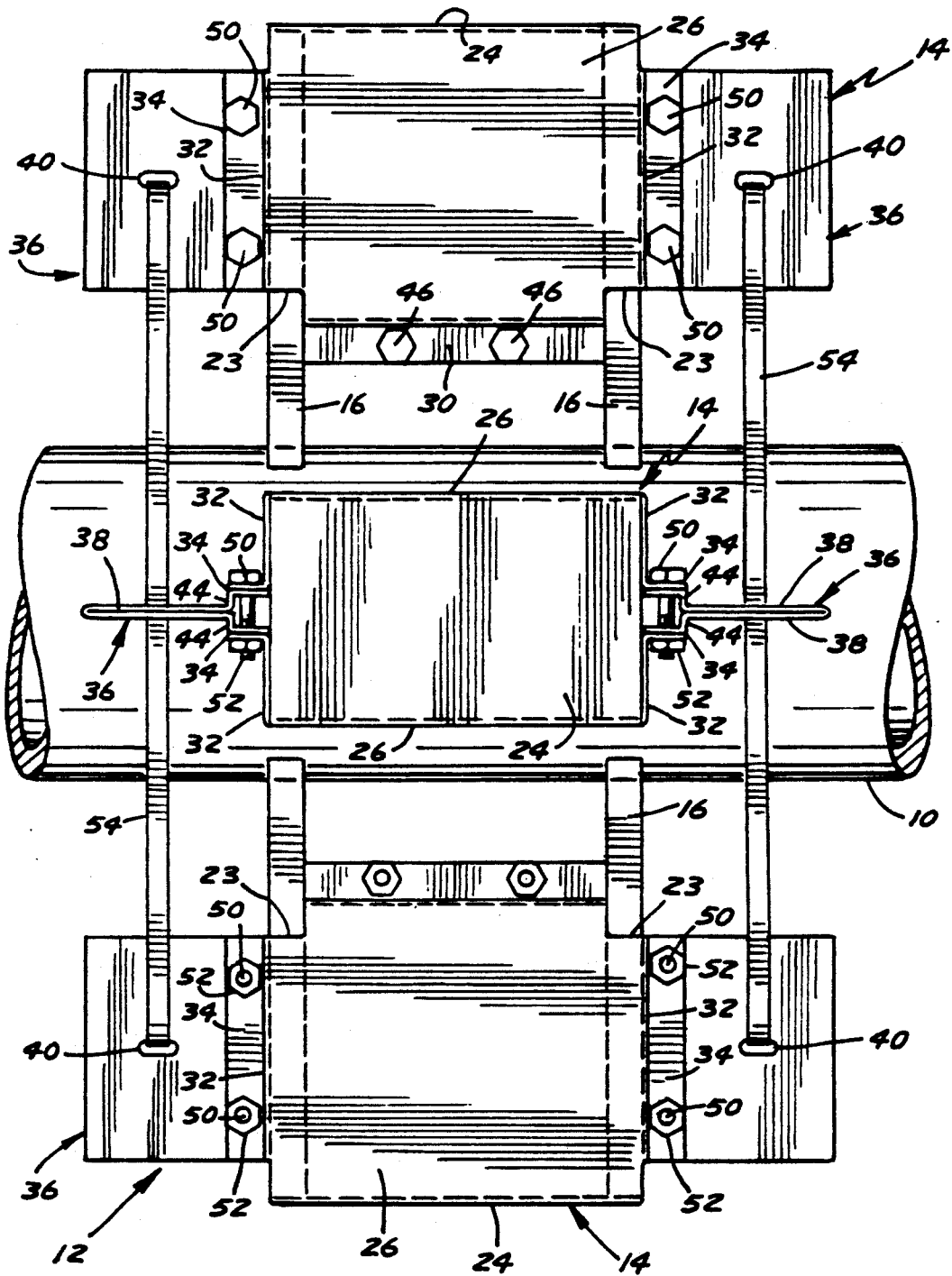
FIG. 2 is an elevational view of the apparatus, the view being taken in the direction of line 2—2 of FIG. 1.

As can be seen in FIGS. 1 and 2, a pipe indicated by the reference numeral 10 has been shown. The pipe 10 may be of a non-magnetic material, such as a suitable plastic, or carbon steel pipe, the pipe 10 in FIG. 1 having been hatched for metal. Also, the pipe 10, in practice, may vary considerably in diameter. As already pointed out, the invention is applicable for use with pipes having a four-inch diameter ranging up to those having a 60-inch diameter. The manner in which various pipe diameters are accommodated will become clear as the description progresses.

In juxtaposition with the pipe 10 is apparatus denoted generally by the reference numeral 12 which exemplifies my invention. The apparatus 12 is comprised of four units 14 in the present instance.

Figure 5:
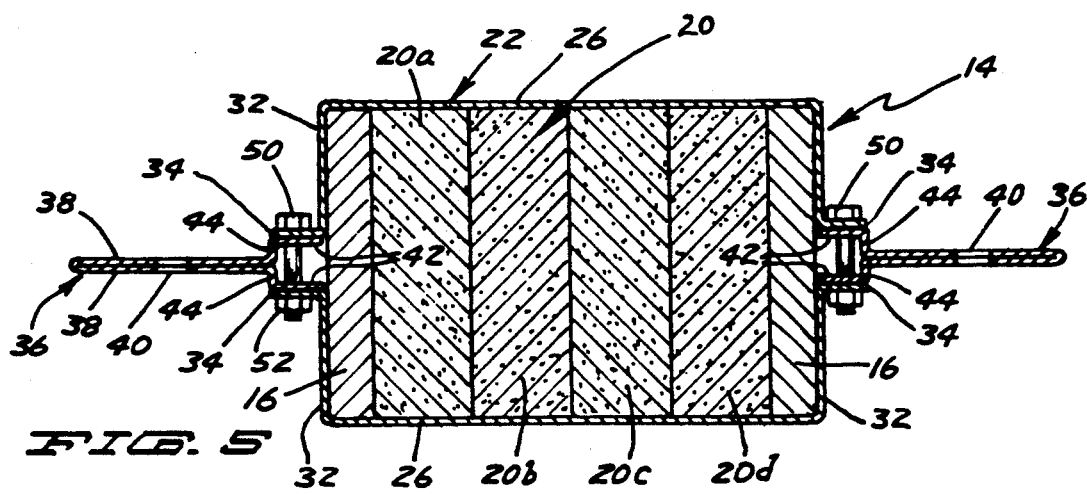
FIG. 5 is a horizontal sectional view taken in the direction of line 5—5 of FIG. 3.

Describing the units 14, which are identical to each other, it will be observed that the unit 14 in each situation includes a pair of longitudinally spaced soft iron pole pieces 16 having angled pole faces 18, the angulation enabling the pole faces 18 to better engage a segment of the outside of the pipe 10. As best understood from FIG. 5, the pole pieces 16 have a permanent magnet pack 20 therebetween composed of four individual ceramic permanent magnets 20a, 20b, 20c, and 20d.

Completely enclosing the permanent magnet pack 20 is a housing 22 of stainless steel sheet metal. As can readily be appreciated from FIG. 3, the housing 22 only partially encloses the pole pieces 16, it being necessary for these pole pieces 16 to project beyond the housing 22 so as to effectively engage the pipe 10, doing so through slots at 23.

One of the features of my invention is to obviate the need for employing a potting compound, the construction of the housing 22 that I have devised avoiding the use of any such compound. The housing 22, as oriented in FIGS. 3-5, includes a bottom panel 24, laterally spaced side panels 26 and inwardly extending top panels 28, each top panel 28 having an upstanding flange 30 integral therewith. Additionally, the housing 22 includes two panels 32 at each end, each having an outturned flange 34.

Playing an important role in the practicing of my invention are oppositely issuing wings 36, each composed of reversely folded panels 38. Each wing 36 has an aperture in the form of a slot 40 formed therein. Also, each wing 36 is provided with a pair of parallel flanges 42, there being outturned shoulders 44 integrally connecting the flanges 42 to the reversely folded panels 38.

Each permanent magnet unit 14 can be readily assembled. This is accomplished through the agency of bolts 46 and nuts 48 that extend through holes provided in the upstanding flanges 30. Tightening of the bolts 46 and nuts 48 pull the side panels 26 tightly against the permanent magnet pack 20. Additional bolts 50 and nuts 52 extend through holes provided in the flanges 34 and 42 fixedly anchor the wings 36 to the housing 22. The bolts 50 and nuts 52 also contribute to the pulling of the side panels 26 against the permanent magnet pack 20. From the foregoing description it should be understood that the resulting unit 14 is tightly held together with no loose components and without the use of a potting compound. This facilitates the mounting of the various units 14 in association with the pipe 10.

The ease with which the various units 14 can be mounted in juxtaposition with the pipe 10 is readily understood from FIGS. 1 and 2. All that the installer need do is to thread a pair of suitably dimensioned wires or straps 54 through the various slots 40. Each of the slots 40 of the wings 36 is spaced outwardly with respect to the pipe 10 and at a sufficient distance so as to space the straps 54 outwardly with respect to the pipe 10. The ends of the straps 54 when overlapped may be drilled so that bolts 56 can be inserted through the thus formed holes. Nuts 58 when tightened on the threaded ends of the bolts complete the fastening and can be twisted to hold the units 14 in place or crimped-on fasteners can be used. Inasmuch as there are a variety of ways of attaching the ends of the straps 54 together, the bolt and nut securement is only exemplary.

It is believed that a sufficient amount of information has been presented so that it is apparent that any appropriate number of permanent magnet units 14 may be employed, depending largely upon the diameter of the pipe 10. Earlier herein it has been stated that a simple formula for guiding the installer is that there should be one such unit 14 for each inch of diameter of the pipe 10. The pipe 10 can be considered to possess a diameter of four inches, and hence, four units 14 are pictured. With a 60-inch diameter pipe, one would use 60 such units 14.

Not only can my apparatus 12 be easily installed at a desired location along a pipe 10, preferably where there is a straight run devoid of turns, the apparatus 12 can be dismantled just as easily and reinstalled at any other location that may prove to be more beneficial in eliminating or minimizing deposits on the interior of the pipe 10. As well understood, the avoidance of any scale formations within a pipe through which liquid flows is most desirable. This is especially true in industrial situations because of the time required to clean out the pipes once there has been an accumulation of scale to any degree. The shutdown time can be quite costly. My invention eliminates such expense in most instances, and substantially reduces the costs in other instances by reason of the less frequent shutdowns.

Figure 6:
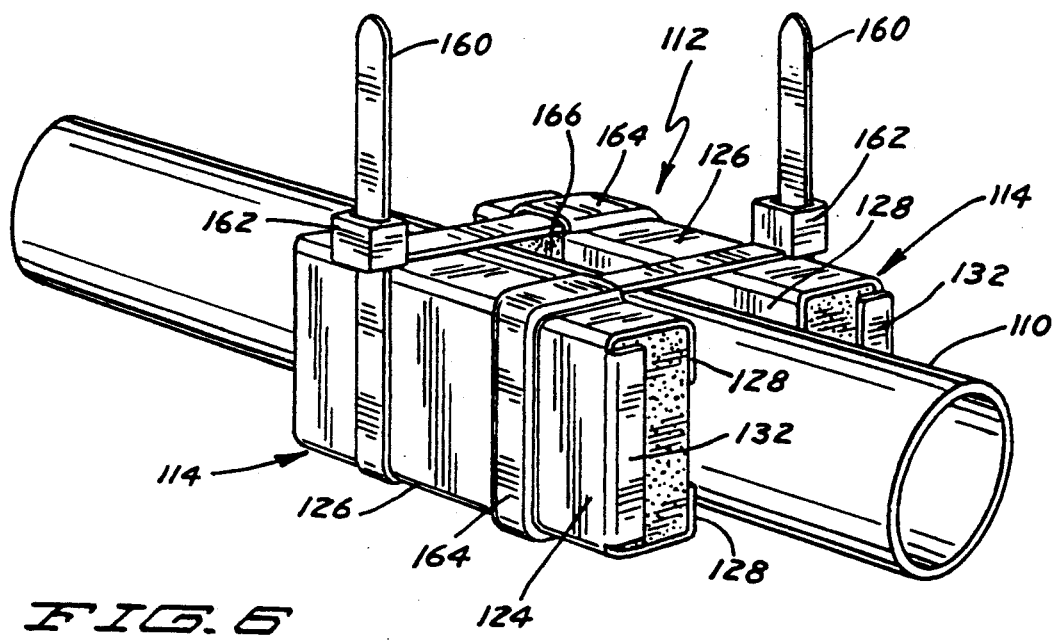
FIG. 6 is a perspective view of an alternate magnetic apparatus attached to a pipe.
Figure 7:
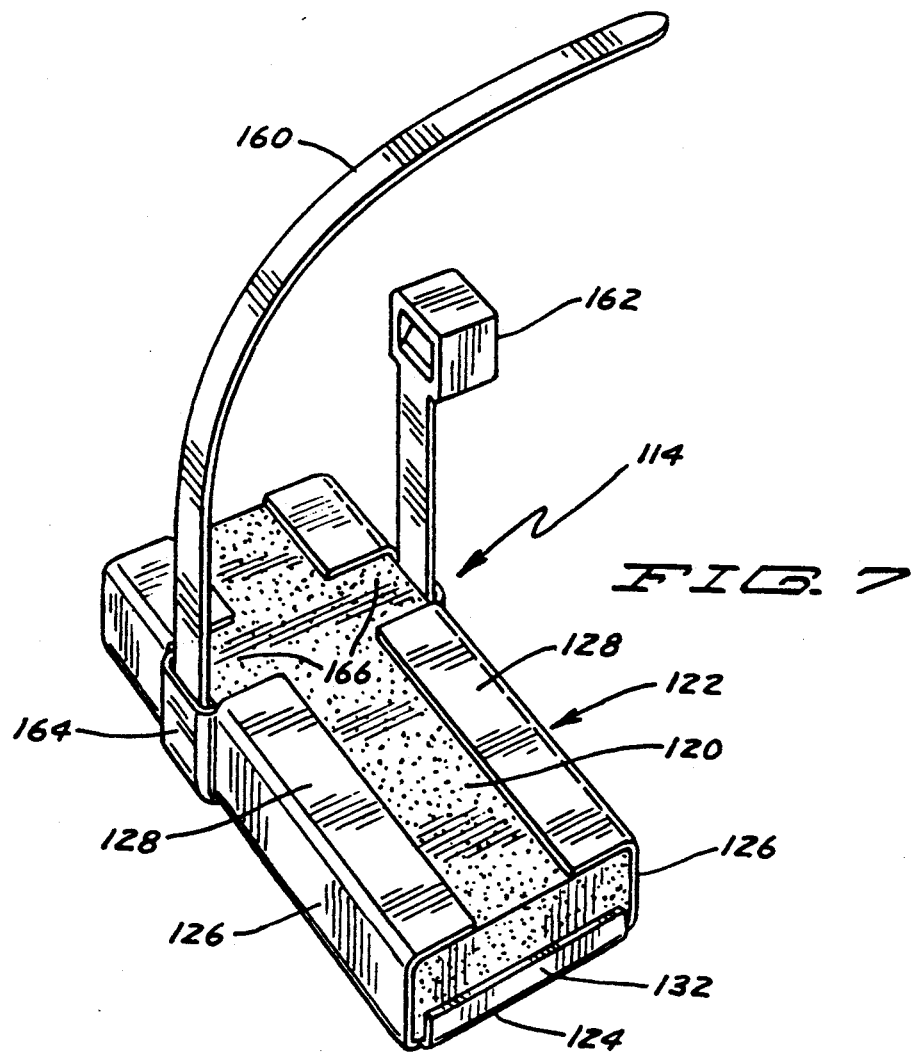
FIG. 7 is a perspective view of a unit of the apparatus of FIG. 6, with each unit of the apparatus being identical.

As can be seen in FIGS. 6 and 7, a pipe indicated by the reference numeral 110 has been shown. Pipe 110 may be of a non-magnetic material, such as a suitable plastic, copper, rubber, stainless steel, or carbon steel pipe. In juxtaposition with pipe 110 is apparatus denoted generally by the reference numeral 112 which exemplifies another preferred embodiment of my invention. Apparatus 112 is comprised of two units 114 in the present instance.

Describing units 114, which are identical to each other, it will be observed that unit 114 in each situation includes a permanent magnet 120 having a rectangular parallelepiped shape. Completely enclosing permanent magnet 120 is a housing 122 of aluminum sheet metal. As can readily be appreciated from FIGS. 6 and 7, housing 122 only partially encloses permanent magnet 120, it being necessary for permanent magnet 120 to be magnetically accessible through housing 22 so as to effectively engage pipe 110. One of the features of my invention is to obviate the need for employing a potting compound, the construction of housing 122 that I have devised avoiding the use of any such compound. Housing 122 is formed from a flat sheet and includes a base or bottom panel 124, laterally spaced side panels 126, inwardly extending top panels 128, and longitudinally spaced end panels 132. In the preferred form, side panels 126 and end panels 132 are integrally formed with bottom panel 124, with top panels 128 being integrally formed with side panels 126 opposite to bottom panel 124.

Each permanent magnet unit 114 further includes an elongated tie strap 160 having first and second free ends, with the first end having a ratchet-like grip 162 for slideably receiving the second end. Bottom panel 124 and side panels 126 include a depression 164 stamped therein having a shape and size for receipt of tie strap 160. Each top panel 128 includes a cut out 166 extending from its free edge to its interconnection to the respective side panel 126 and having a width generally equal to the width of tie strap 160.

Each permanent magnet unit 114 can be readily assembled. This can be accomplished by placing tie strap 160 in depression 164 with the free ends thereof extending beyond the free edges of top panels 128. Thereafter, permanent magnet 120 can be placed on bottom panel 124 with tie strap 160 being captured in depression 164 of bottom panel 124 by permanent magnet 120. Side panels 126 (with top panels 128 integrally formed thereon) can then be bent to extend generally perpendicularly to bottom panel 124 and abut with the sides of permanent magnet 120. End panels 132 can then be bent to extend generally perpendicularly to bottom panel 124 and abut with the ends of permanent magnet 120, with the height of end panels 132 being less than the height of side panels 126 and the height of permanent magnet 120 in the preferred form. For aesthetic purposes, a cover can be provided to cover the end of permanent magnet 120 above end panels 132. Alternately, end panels 132 and side panels 126 (with top panels 128 integrally formed thereon) can be pre-bent to be perpendicular to bottom panel 124 and tie strap 160 and permanent magnet 120 being slideably received therein. Top panels 128 can then be bent to extend generally perpendicular to side panels 126 and abut with the top of permanent magnet 120. The combined width of top panels 128 is less than the width of bottom panel 124 and of permanent magnet 120 such that the free edges of top panels 128 are spaced from and parallel to each other providing a slot therebetween via which the permanent magnet 120 is magnetically accessible. It should be noted that cut outs 166 formed in top panels 128 allow elongated tie strap 160 to extend from permanent magnet 120 generally contiguously from its sides and side panels 126 of housing 122. It should also be noted that tie strap 160 is sandwiched between permanent magnet 120 and bottom panel 124 and side panels 126 inside of depression 164 and is held from sliding relative thereto due to tie strap 160 extending generally around the square corner between the bottom and sides of permanent magnet 120 and the shaping and sizing of depression 164 for frictionally receiving tie strap 160 against permanent magnet 120. It should be noted that depression 164 allows bottom panel 124 and side panels 126 and tie strap 160 to flushly abut with the bottom and sides of permanent magnet 120, with bottom panel 124, side panels 126, top panels 128, and end panels 132 defining a volume of a size and shape generally equal to the size and shape of permanent magnet 120. From the foregoing description it should be understood that the resulting unit 114 is tightly held together with no loose components and without the use of a potting compound. This facilitates the mounting of the various units 114 in association with pipe 110.

The ease with which the various units 114 can be mounted in juxtaposition with the pipe 110 is readily understood from FIG. 6. All that the installer need do is to place first and second units 114 reversed end to end in a parallel relation to and sandwiching pipe 110, with permanent magnets 120 of each unit 114 abutting pipe 110 on diametrically opposite sides through the slot between top panels 128. At that time and with tie straps 160 extending around pipe 110 and around the other unit 114, the second free end of tie strap 160 of the first unit 114 is inserted into and pulled through ratchet-like grip 162 (with grip 162 only allowing tie strap 160 to be pulled through ratchet-like grip 162 but preventing its passage in the reverse direction) until tie strap 160 tightly extends around the second unit 114 and pipe 110. Similarly, the second free end of tie strap 160 of the second unit 114 is inserted into and pulled through ratchet-like grip 162 until tie strap 160 tightly extends around the first unit 114 and pipe 110. Inasmuch as there are a variety of ways of attaching the free ends of tie straps 160 together, the ratchet-like grip securement is only exemplary.

Apparatus 112 can be easily installed at a desired location along a pipe 110, preferably where there is a straight run devoid of turns. In the most preferred form, apparatus 112 can be installed on the fuel lines for internal combustion engines of cars, trucks, buses, tractors, and the like or for oil fired boilers. Apparatus 112 helps break up suspended molecules and disperse them in the fuel so that they mix more completely with the air resulting in a more complete burn with reduced emissions. Also, the fuel under the action of apparatus 112 helps remove existing carbon and scale in the combustion chamber to promote more efficient operation.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Magnetic unit comprising, in combination:
   permanent magnet means;
   housing means generally enclosing said permanent magnet means;
   and means for attaching said housing to a pipe for use in retaining the permanent magnet means against the pipe, in which said housing means is formed from a flat sheet including a base panel, first and second side panels connected to and extending generally perpendicularly in a first direction from the base panel, first and second top panels connected to the first and second side panels, respectively, said first and second side panels extending toward each other generally perpendicularly from the first and second side panels and parallel to and spaced from the base panel, and first and second end panels extending generally perpendicular to the first and second side panels, said first and second end panels extending generally perpendicular to the base panel in said first direction, said first and second end panels connected to one of the base panel or first and second side panels, respectively, with the base, side, top, and end panels contacting the permanent magnet means, said magnet means being magnetically accessible via at least one opening through said housing means, said at least one opening being located adjacent the first and second top panels.

2. The magnetic unit of claim 1 wherein the permanent magnet means includes a pair of spaced pole pieces, wherein said at least one opening is comprised of a pair of slots, wherein a said pole piece projects through a respective said slot beyond the top panels.

3. The magnet unit of claim 2 wherein each of the top panels includes a flange extending outwardly from the magnet means, with the flanges of the top panels being generally parallel to each other; and wherein the housing further comprises bolt means extending through the flanges on said top panels.

4. The magnetic unit of claim 3 wherein the first and second side panels each include first and second ends extending generally perpendicular to the base in said first direction;
   wherein said first end panel is comprised of first and second end panel sections connected to the first ends of the first and second side panels, respectively;
   wherein said second end panel is comprised of third and fourth end panel sections connected to the second ends of the first and second side panels, respectively;
   with each of said end panel sections including a flange extending outwardly from the permanent magnet means, with the flanges of the first and second end panel sections and of the third and fourth end panel sections being generally parallel to each other, wherein the housing means further comprises first and second bolt means extending through the flanges of the first and second end panel sections and extending through the flanges of the third and fourth end panel sections, respectively.

5. The magnet unit of claim 4 wherein the attaching means comprises a pair of wings extending outwardly from the permanent magnet means, with the additional bolt means extending through the wings and the flanges on said end panels.

6. The magnet unit of claim 5 wherein the wings include spaced, parallel flanges and the flanges on said end panels are spaced, with the additional bolt means extending through the flanges of the wings.

7. The magnet unit of claim 5 in which each of said wings include first and second panels each including first and second edges, with the first edge of the first panel being integral with the first edge of the second panel of the wings, with the first and second panels of the wings being folded about their first edges to overlie each other, with the flanges of the wings extending from the second edge of each panel.

8. The magnet unit of claim 1 wherein the first and second top panels each have free edges opposite the respective connections to the side panels, and wherein said at least one opening comprises the free edges of the top panels being spaced from each other providing a slot therebetween via which the permanent magnet means is magnetically accessible.

9. The magnet unit of claim 8 wherein the first and second end panels are connected to the base panel.

10. The magnet unit of claim 9 wherein the attaching means comprises, in combination: an elongated tie strap having first and second free ends, with the elongated tie strap being sandwiched between the permanent magnet means and the base and side panels and intermediate the first and second free ends; and means formed in the top panels allowing the elongated tie strap to extend from the permanent magnet means generally contiguously from the side panels of the housing.

11. The magnet unit of claim 10 wherein the allowing means comprises a cut out extending from the free edge of each of the top panels to the side panel having a width generally equal to the width of the elongated tie strap.

12. The magnet unit of claim 11 wherein the flat sheet forming the housing includes a depression stamped in the base and side panels having a shape and size for receipt of the elongated tie strap for frictionally holding the tie strap against the permanent magnet means.

13. The magnet unit of claim 1 wherein the attaching means comprises an elongated tie strap having first and second free ends, with the elongated tie strap being sandwiched between the permanent magnet means and the base and side panels and intermediate the first and second free ends; and means formed in the top panels allowing the elongated tie strap to extend from the permanent magnet means generally contiguously from the side panels of the housing.

14. The magnet unit of claim 13 wherein the first and second top panels each have free edges opposite the respective connections to the side panels, and wherein the allowing means comprises a cut out extending from the free edge of each of the top panels to the side panel having a width generally equal to the width of the elongated tie strap.

15. The magnet unit of claim 14 wherein the flat sheet forming the housing includes a depression stamped in the base and side panels having a shape and size for receipt of the elongated tie strap for frictionally holding the tie strap against the permanent magnet means.

16. The magnet unit of claim 14 wherein said at least one opening is comprised of the free edges of the top panels being spaced from each other providing a slot therebetween via which the permanent magnet means is magnetically accessible, with the cut outs of the top panels intersecting with the slot.

17. The magnet unit of claim 13 wherein the flat sheet forming the housing includes a depression stamped in the base and side panels having a shape and size for receipt of the elongated tie strap for frictionally holding the tie strap against the permanent magnet means.

18. The magnet unit of claim 1 wherein the first and second end panels are connected to the base panel.

* * * * *